United States Patent
Kuiper et al.

(10) Patent No.: US 8,854,739 B2
(45) Date of Patent: Oct. 7, 2014

(54) ELECTROWETTING DEVICE

(75) Inventors: Stein Kuiper, Eindhoven (NL);
Johannes Wilhelmus Weekamp,
Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 102 days.

(21) Appl. No.: 13/499,918

(22) PCT Filed: Sep. 29, 2010

(86) PCT No.: PCT/IB2010/054378
§ 371 (c)(1),
(2), (4) Date: Apr. 3, 2012

(87) PCT Pub. No.: WO2011/042835
PCT Pub. Date: Apr. 14, 2011

(65) Prior Publication Data
US 2012/0200939 A1   Aug. 9, 2012

(30) Foreign Application Priority Data
Oct. 6, 2009 (EP) .................................. 09172296

(51) Int. Cl.
*G02B 1/06* (2006.01)
*G02B 26/00* (2006.01)
*G02B 3/14* (2006.01)
(52) U.S. Cl.
CPC ................ *G02B 3/14* (2013.01); *G02B 26/005* (2013.01)
USPC .......................................................... 359/665

(58) Field of Classification Search
CPC ..................................................... G02B 26/005
USPC ......................................................... 359/665
See application file for complete search history.

(56) References Cited

U.S. PATENT DOCUMENTS

| 2005/0128685 A1* | 6/2005 | Hasegawa ..................... 361/525 |
| 2006/0221458 A1 | 10/2006 | Kato |
| 2008/0100905 A1* | 5/2008 | Kato et al. .................... 359/295 |
| 2008/0218444 A1 | 9/2008 | Rosser |

FOREIGN PATENT DOCUMENTS

DE   102007018959 A1   10/2008

* cited by examiner

*Primary Examiner* — Jospeh P Martinez
(74) *Attorney, Agent, or Firm* — Larry Liberchuk

(57) ABSTRACT

The invention relates to an electrowetting-on-dielectric device (200). This is an electrowetting device comprising one or more cells, wherein each cell comprises an electrowetting composition of first and second immiscible fluids, the first fluid being an electrolytic solution (240), a first electrode (230), separated from the electrowetting composition by a dielectric (231), and a voltage source (260) for applying an operating voltage difference between the first electrode (230) and the electrolytic solution to operate the electrowetting device. According to the invention, the first electrode (230) of the electrowetting-on-dielectric device (200) comprises a valve metal, and the electrolytic solution (240) is capable of anodizing the valve metal to form a metal oxide at the operating voltage difference. This provides the electrowetting-on-dielectric device (200) with self-repairing properties thereby preventing breakdown of the dielectric. As a result, the electrowetting device can be operated at a low voltage, and it has an improved reliability.

17 Claims, 2 Drawing Sheets

ELECTROWETTING DEVICE

FIELD OF THE INVENTION

The invention relates to an electrowetting device comprising one or more cells, each cell comprising (a) an electrowetting composition comprising first and second immiscible fluids, the first fluid being an electrolytic solution, (b) a first electrode, separated from the electrowetting composition by a dielectric, and (c) a voltage source for applying an operating voltage difference between the first electrode and the electrolytic solution to operate the electrowetting device.

The invention also relates to methods of manufacturing and of operating the above-mentioned electrowetting device.

BACKGROUND OF THE INVENTION

Electrowetting is electrostatic control of the contact angle between a liquid and a solid. A voltage difference applied between a conductive liquid and a conductive substrate reduces the interfacial energy, which increases the degree of wetting of the substrate by the liquid. Electrowetting can be applied to move and shape volumes of liquids. For example, when a water droplet is present on a hydrophobic surface, the contact area between the two is minimized. However, when a suitable voltage difference is applied between a first electrode that is present underneath the hydrophobic surface and a second electrode that is placed in the water droplet, the water droplet spreads over the hydrophobic surface (in other words, the hydrophobic properties of the surface appear to decrease). When the voltage difference is removed, the water droplet returns to its original state.

An electrowetting device is a device that, in operation, makes use of the electrowetting effect. Electrowetting devices are used in a wide range of applications, including variable-focus lenses (such as a variable-focus contact lens), electronic displays, switches for optical fibers, and microelectromechanical systems (such as microfluidic devices and lab-on-a-chip devices).

Electrowetting devices typically comprise a cell wherein an electrowetting composition comprising two immiscible fluids, one of which is polar and/or electrically conductive can be manipulated by applying a voltage difference between two electrodes.

To prevent electrolysis of the electrowetting composition, one of the electrodes may be separated from the electrowetting composition by a dielectric medium (in the remainder of this text simply called a dielectric). Such an electrowetting device is usually referred to as an electrowetting-on-dielectric (EWOD) device. The other electrode may be in direct contact with the polar and/or electrically conductive liquid, or it may be capacitively-coupled to this liquid.

EWOD devices typically have a dielectric that comprises an amorphous fluoropolymer (for example, Teflon® AF), silicon dioxide ($SiO_2$), or parylene (a poly(p-xylylene) polymer that can be deposited by chemical vapor deposition), or a stack of these layers, having a thickness in the order of micrometers so that a relatively high voltage difference (on the order of 100 V) is required to operate these devices.

To reduce device size and/or power consumption and to be able to use standard electronic components, there is a need for EWOD devices that can be operated at lower voltages.

The required operating voltage of an EWOD device can be reduced by increasing the dielectric constant and/or by decreasing the thickness of the dielectric, thus increasing the capacitance of the dielectric.

Reducing the thickness of the dielectric leads to a lower operating voltage, but also to a larger electric field inside the dielectric, and to a higher probability for the occurrence of pinholes in the dielectric. Below a certain minimum layer thickness, electric breakdown of the dielectric (also referred to as dielectric breakdown) occurs before the desired electrowetting effect is obtained.

EWOD devices that can be operated at a reduced voltage are disclosed in US-2006/0221458 and US-2008/0100905, respectively. These known EWOD devices comprise a container with a conductive or polar liquid material, and a first electrode for applying a voltage to the conductive or polar liquid material through a dielectric. The dielectric is a metal oxide layer formed by anodizing the first electrode. The thickness of the dielectric can be adjusted easily and accurately by adjusting the voltage that is applied during the anodization process. Moreover, metal oxides of comparatively high dielectric constant can be formed by anodizing aluminum and tantalum. Furthermore, such metal oxides can be made into pinhole-free layers.

A drawback of the known EWOD devices is that over time dielectric breakdown may still occur, for instance as a result of mechanical stress, dielectric fatigue or ion injection from the fluids during the lifetime of the devices.

SUMMARY OF THE INVENTION

It is an object of the invention to provide an electrowetting device that can be operated at a low voltage, and that has an improved reliability.

It is also an object of the invention to provide a method for manufacturing such an electrowetting device.

It is a further object of the invention to provide a method for operating such an electrowetting device.

According to a first aspect of the invention, the object is realized by an electrowetting device according to the opening paragraph, wherein the first electrode comprises a valve metal, and wherein the electrolytic solution is capable of anodizing the valve metal to form a metal oxide at the operating voltage difference.

Essentially, the electrowetting device according to the invention comprises an electrolytic capacitor. A capacitor comprises two conductive plates separated by a dielectric medium, and in an electrolytic capacitor one of the "plates" is a metallic anode while the other is an electrolytic solution. An electrolytic solution is a solution of an electrolyte in a solvent, an electrolyte being a chemical compound (such as a salt, an acid, or a base) that dissociates into electrically charged ions when dissolved in a solvent. An electrolytic solution (also called electrolyte solution, ionic solution, or simply electrolyte) is an ionic conductor of electricity.

In an electrolytic capacitor, the electrolytic solution is capable of anodizing the metallic anode. Usually, the dielectric medium of an electrolytic capacitor is a metal oxide produced from the metallic anode in an anodization process. During this anodization process, electrical current flows from the metallic anode through a bath containing an electrolytic anodization solution to a bath cathode. The flow of electrical current causes an insulative metal oxide to grow out of and into the surface of the metallic anode. The thickness, structure and composition of this insulative metal oxide layer determine its dielectric strength. For this purpose, the anode must comprise a valve metal, being a metal from which an oxide is formed under anodic conditions in an electrolytic cell. Valve metals include magnesium, aluminum, titanium, vanadium, chromium, zinc, zirconium, niobium, antimony, hafnium, tantalum, tungsten, and bismuth.

In the electrowetting device according to the invention, the electrolytic capacitor is formed by the first electrode and the electrolytic solution, separated by the dielectric, wherein the electrolytic solution (the first fluid of the electrowetting composition) is an electrolytic anodization solution.

In an electrolytic capacitor, the electrolytic anodization solution is capable of repairing and thickening the dielectric medium locally as required, a process that is driven by the capacitor's leakage current that is drawn when it is in operation. A similar self-repairing (or healing) mechanism applies in the electrowetting device according to the invention, resulting in an improved reliability of the device.

In the electrowetting device according to the invention, the dielectric may be a single layer, or a multi-layer structure (a stack). The dielectric may be a metal oxide produced from a metallic anode in an anodization process, although this does not necessarily has to be so. Basically, any dielectric may be used, as long as the combination of first electrode and electrowetting composition provides the electrowetting device with the above-mentioned self-repairing functionality. This means that the electrowetting device according to the invention has an improved reliability even when a dielectric is used that is not obtained by anodization of the first electrode, such as, for example, a dielectric comprising parylene or a polyester such as polyethylene terephthalate (PET). An advantage of using a polyester, such as PET, is that it is a cheap material that can readily be structured with an excimer laser. Consequently, it is very well suited for use in low-cost disposable applications, for example lab-on-a-chip applications.

In the electrowetting device according to the invention, the first fluid of the electrowetting composition is an electrolytic anodization solution capable of anodizing the valve metal of the first electrode to form a metal oxide at the operating voltage difference. In other words, the first fluid is susceptible to an electric field. The second fluid of the electrowetting device, that is immiscible with the first fluid, is much less susceptible to an electric field than the first fluid. The second fluid may be an oil, for example silicone oil, or air.

The electrolytic anodization solution may be any such solution as used in an electrolytic capacitor, as these solutions provide the self-repairing (or healing) mechanism as described above, while maintaining the integrity of the dielectric. Additionally, for use in the electrowetting device according to the invention the electrolytic anodization solution does not have to comply with the same conductivity requirements as for electrolytic capacitors, in that a relatively high electrical conductivity is not required. Generally, the lower the concentration of ions in the electrolytic anodization solution, the lower the probability for dielectric breakdown, and the higher the reliability of the electrowetting device.

The electrolytic anodization solution preferably comprises a polar solvent such as water. Besides water, several other polar solvents may also be used, such as polyhydric alcohols, gamma-butyrolactone (GBL), dimethylformamide (DMF), N-methylpyrrolidinone (NMP), amides, polypyrrole, molten salts and any combination of these.

Particularly preferred electrolytic anodization solutions are those that result in substantially non-porous (or pinhole free) anodized metal oxide layers. Examples of such solutions are solutions of citric acid, tartaric acid and boric acid, and also solutions of ammonium borate, ammonium tartrate and ammonium phosphate.

In the electrowetting device according to the invention, a voltage difference is applied between the first electrode and the electrolytic solution (the first fluid of the electrowetting composition) by a voltage source. Obviously, this can be done by connecting one terminal of the voltage source to the first electrode, and the other terminal to a second electrode that is either directly coupled to the electrolytic solution, or capacitively coupled via an intermediate insulative layer.

The second electrode is preferably inert with respect to the electrolytic anodization solution (the first fluid of the electrowetting composition). For example, the second electrode may be a stainless steel electrode.

In order to obtain a suitable balance between chemical stability and internal electrical resistance, the first fluid (the electrolytic anodization solution) may comprise additives such as sugars and/or ethylene glycol.

In the electrowetting device according to the invention, the dielectric may be a stack of layers, wherein the stack comprises a hydrophobic layer that is in contact with the electrowetting composition. Preferably, the hydrophobic layer comprises an amorphous fluoropolymer, such as Teflon®.

The dielectric may comprise a metal oxide layer that has been formed by anodizing the valve metal of the first electrode.

The electrolytic anodization solution may be an acidic solution or an alkaline solution. When the electrowetting device comprises a Teflon® layer, the use of an acidic solution is preferred, because experiments have shown that alkaline solutions cause negative charging of the surface of the Teflon® layer, due to a preferred adsorption of hydroxyl ions ($OH^-$) over hydronium ions ($H_3O^+$). Acidic solutions contain much fewer hydroxyl ions than alkaline solutions, thus reducing the adsorption probability of hydroxyl ions.

When the electrolytic anodization solution is an acidic solution it may comprise an organic acid. Organic acids may either be aliphatic or aromatic organic acids. Aliphatic organic acids either have straight chains, branched chains, or non-aromatic rings.

Examples of suitable aliphatic organic acids are the mono-carboxylic organic acids acetic acid, propionic acid, acrylic acid, and butyric acid. Such organic acids may be used alone, or in combination with salts such as ammonium acid borate, sodium borate, sodium potassium tartrate, ammonium phosphate, sodium acetate or ammonium acetate.

Derivatives of mono-carboxylic organic acids may also be used, such as lactic acid, hydroxy-acrylic acid, crotonic acid, ethylene lactic acid, dihydroxy propionic acid, isobutyric acid, diethyl acetic acid, iso-amyl acetic acid and iso-butyl acetic acid.

Next to mono-carboxylic organic acids, multi-carboxylic acids may also be used, such as the di-carboxylic organic acid tartaric acid and the tri-carboxylic citric acid.

Examples of suitable aromatic organic acids are creyulic acid (cresol) and carbolic acid (phenol).

Next to organic acids, inorganic acids may also be used, either alone or in combination with an organic acid. An example of a suitable inorganic acid is boric acid.

A preferred acid is an acid chosen from the group consisting of citric acid, tartaric acid and boric acid, as an electrolytic anodization solution comprising such an acid results in substantially non-porous (or pinhole free) anodized metal oxide layers.

In the electrowetting device according to the invention, the first fluid of the electrowetting composition may comprise a salt, preferably a salt chosen from the group consisting of borates, tartrates, citrates and phosphates, as they result in substantially non-porous (or pinhole free) anodized metal oxide layers.

In the electrowetting device according to the invention, the valve metal of the first electrode may be chosen from the group consisting of magnesium, aluminum, titanium, vanadium, chromium, zinc, zirconium, niobium, antimony, hafnium, tantalum, tungsten, and bismuth.

In case of a pinhole in the dielectric, the self-repairing mechanism will start. During this process hydrogen gas is created on the anode (the first electrode). Small amounts of this gas can dissolve, but larger amounts will build up pressure, and may disturb the function of the electrowetting device, particularly when the device has a lens function. This problem can be solved by making a pressure relief valve, or by adding a hydrogen getter to the electrolytic solution. Examples of suitable hydrogen getters are nitroaromatics and amine salts, typically in concentrations of 1%.

According to a second aspect of the invention, the object is realized by a method of manufacturing the above electrowetting device, comprising the step of forming the dielectric by anodizing the valve metal of the first electrode.

According to a third aspect of the invention, the object is realized by a method of operating the above electrowetting device, comprising the step of applying a voltage difference between the first electrode and a second electrode, such that a time-averaged net positive voltage is applied to the first electrode. The method of operating preferably uses DC voltages with the first electrode having a positive polarity to enable anodization. Furthermore, in case the dielectric comprises a metal oxide, the use of DC voltages prevents dissolution of the metal oxide. However, AC voltages may also be used in order to prevent charging of the dielectric. If AC driving is performed such that on average a net positive voltage is applied to the first electrode, the metal oxide comprised in the dielectric should not dissolve.

An alternative method for applying AC voltages to the electrowetting device according to the invention is to use a capacitor in series with the device, in such a way that a so-called "back-to-back" configuration is created. In other words, in addition to a voltage source a capacitor is inserted between an electrode and the electrowetting composition. This method is known for driving electrolytic capacitors with an AC voltage.

DETAILED DESCRIPTION OF THE EMBODIMENTS

Figure 1A:
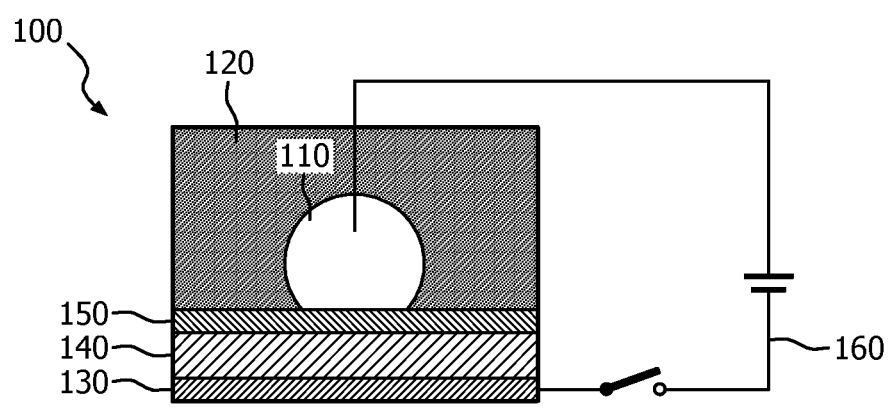
FIGS. 1a and 1b show a cross-section of a cell that may be comprised in an electrowetting device according to the present invention.

FIGS. 1 and 2 show cross-sections of several cells that may be comprised in an electrowetting device according to the present invention.

In FIG. 1, cell 100 comprises an electrowetting composition of a first fluid 110 and a second fluid 120. The first fluid 110 is immiscible with the second fluid 120. Furthermore, the first fluid 110 is an electrolytic solution. The cell 100 further comprises a first electrode in the form of the aluminum layer 130, aluminum being a valve metal, and it is separated from the electrowetting composition by dielectric in the form of a stack comprising a parylene layer 140, and a hydrophobic coating 150, wherein the latter is in contact with the electrowetting composition.

Figure 1B:
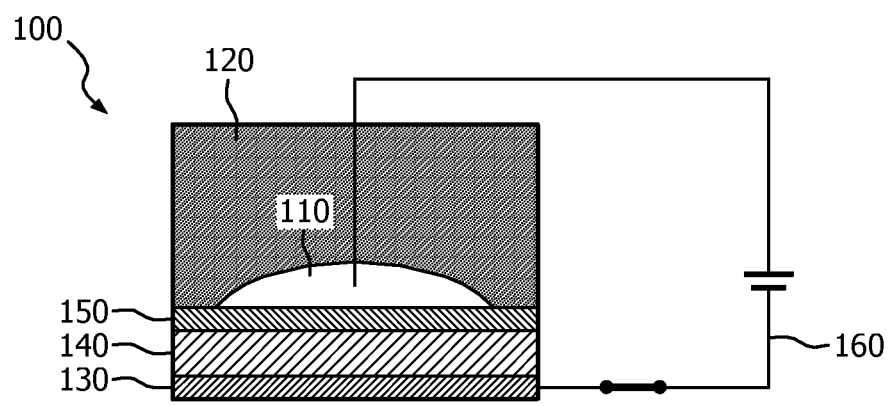

The cell 100 also comprises a DC voltage source in the form of a battery 160, of which the positive terminal is connected to the aluminum layer 130, and the negative terminal to the first fluid 110. In FIG. 1a no voltage is applied, while in FIG. 1b an operating voltage difference is applied between the aluminum layer 130 and the first fluid 110. Consequently, the electrowetting effect is obtained as illustrated by the change in interface between the first fluid 110 and the second fluid 120, caused by electromechanical forces, leading to an apparent change in hydrophobic properties of the hydrophobic coating 150. At this operating voltage difference, first fluid 110, being an electrolytic solution, is capable of anodizing the aluminum of the aluminum layer 130 to form aluminum oxide.

Alternatively, a cell such as that shown in FIG. 1 may have a dielectric that, instead of the parylene layer 140, comprises a metal oxide layer, preferably an aluminum oxide layer that is obtained by anodization of the aluminum layer 130, or a polyethylene terephthalate (PET) layer. Furthermore, the aluminum layer 130 may be provided on a carrier, such as a glass carrier or a silicon carrier.

FIG. 2 shows cross-sections of a variable-focus lens 200, being an example of an electrowetting device according to the invention.

The variable-focus lens 200 comprises a first transparent substrate 210, a second transparent substrate 220, and a metallic spacer 230 spacing apart the first transparent substrate 210 and the second transparent substrate 220. The first transparent substrate 210, the second transparent substrate 220, and the metallic spacer 230 constitute a cell that contains an electrowetting composition, comprising an aqueous electrolytic solution 240 and an oil 250, both with different optical properties.

The metallic spacer 230 is the first electrode of the variable-focus lens 200, it comprises a valve metal, and it is coated with a dielectric in the form of a metal oxide layer 231, separating the metallic spacer 230 from the electrowetting composition. The first transparent substrate 210 is coated with a further electrode in the form of a hydrophilic transparent conductive coating 211.

The areas of the second transparent substrate 220 and of the metal oxide layer 231 that are exposed to the electrowetting composition are coated with a hydrophobic transparent coating 221. The hydrophobic transparent coating 221 is also applied on the second substrate 220, in order to prevent any conductive liquid from condensing on the second substrate 220.

Figure 2A:
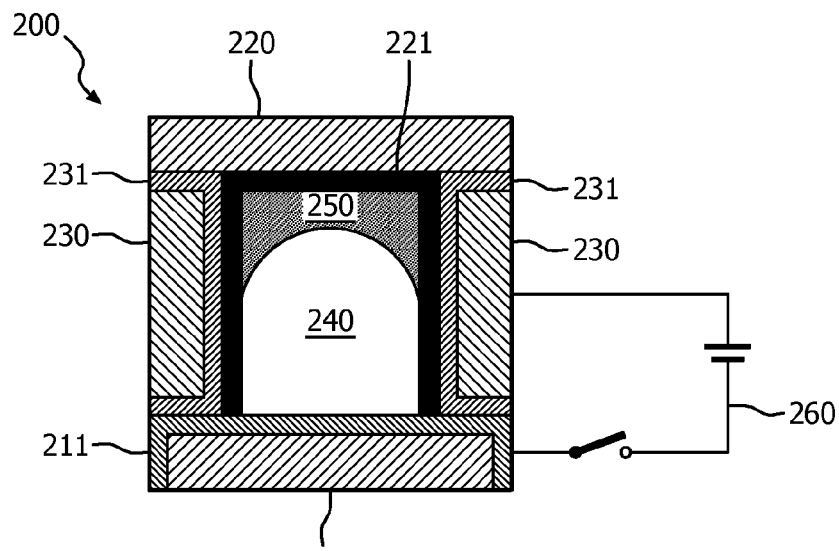
FIGS. 2a and 2b show cross-sections of an example of an electrowetting device according to the invention in the form of a variable-focus lens.
Figure 2B:
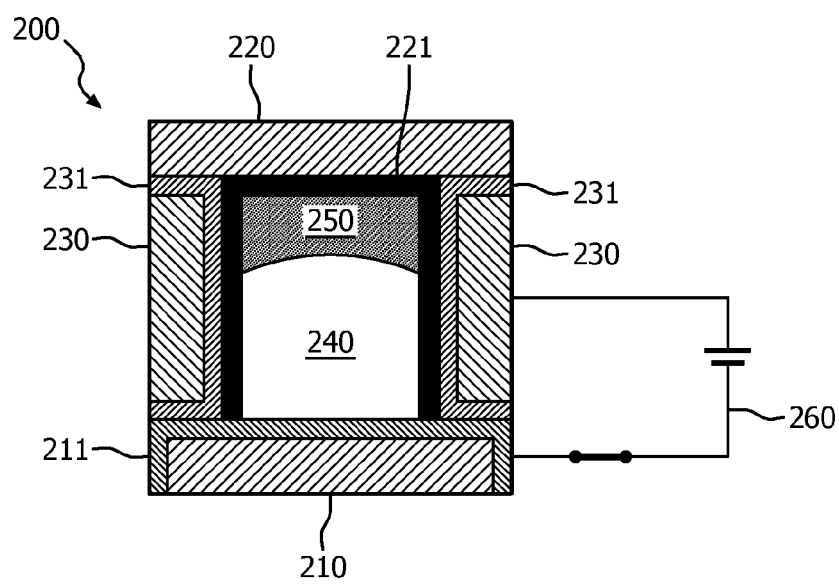

The variable-focus lens 200 also comprises a DC voltage source in the form of a battery 260, of which the positive terminal is connected to the metallic spacer 230, and the negative terminal to the hydrophilic conductive coating 211. The negative terminal is preferably grounded, in order to keep the electrolytic solution 240 at the same potential as the surroundings, thus preventing potential differences between the electrolytic solution 240 and the surroundings to distort the fluid-fluid interface. In FIG. 2a no voltage is applied, while in FIG. 2b an operating voltage difference is applied between the metallic spacer 230 and the hydrophilic conductive coating 211. Consequently, the electrowetting effect is obtained as illustrated by the change in interface between the aqueous electrolytic solution 240 and the oil 250, caused by a change in hydrophobic properties of the hydrophobic coating 221. At this operating voltage difference, the aqueous electrolytic solution 240 of the electrowetting composition is capable of anodizing the valve metal of the metallic spacer 230 to form a metal oxide.

An electrowetting device according to the invention can be manufactured as follows.

An aluminum substrate is placed in an aqueous solution of 8% citric acid and 0.5% phosphoric acid. Anodization of the aluminum substrate is performed by applying a voltage difference between the aqueous solution and the aluminum substrate, with the aluminum substrate forming the anode, while the cathode consists of a plate of stainless steel. The electrical current density is about 10 mA/cm$^2$, the starting anodization voltage is lower than 150 V, and the end anodization voltage is 150 V. After several hours a layer of aluminum oxide with a thickness of 210 nm has grown on the aluminum substrate.

Preferably, the pH of the aqueous solution of citric acid is increased to prevent etching of aluminum and aluminum oxide when no voltage is applied to the device, while maintaining anodization capability and good electrowetting performance. The pH of the aqueous solution of citric acid can be increased by adding a solution of ammonium hydroxide. For example, the pH of one liter of an aqueous solution of 8% citric acid can be increased by adding 0.18 liter of a 5 M ammonium hydroxide solution, to obtain a pH of 6.68.

As a dielectric layer obtained by anodization may be porous, after anodization a sealing process can be performed to make the dielectric layer pinhole free.

The aluminum oxide layer is then coated with a 10 nm layer of the amorphous fluoropolymer Teflon® AF-1600 by means of dipcoating in a 1% Teflon® AF-1600 solution in FC-75 (a fluorocarbon derivative of tetrahydrofuran, with chemical formula $C_8F_{16}O$). The amorphous fluoropolymer coating is annealed at 200° C. for 10 minutes to evaporate any remaining solvent. Deposition of the coating may also be done with gaseous anodization, using an oxygen plasma, or with atomic layer deposition.

Next, a drop of an aqueous solution of 8% citric acid, surrounded by silicone oil, is provided on the amorphous fluoropolymer coating.

The above has resulted in an electrowetting device according to the invention, wherein the first fluid of the electrowetting composition is an electrolytic solution in the form of an aqueous solution of 8% citric acid, and the second fluid of the electrowetting composition is the silicone oil, both fluids being immiscible. The first electrode is the aluminum substrate, that is separated from the electrowetting composition by a dielectric in the form of a stack of the 210 nm thick aluminum oxide layer and the 10 nm thick Teflon® AF-1600 layer.

When the aluminum substrate is connected to the positive terminal of a voltage source, and the drop of an aqueous solution of 8% citric acid, surrounded by silicone oil, is connected to the negative terminal of the voltage source, operating voltages between 0 V and 20 V are obtained, as these voltage differences clearly show the electrowetting effect in that the drop spreads further upon increase of the voltage difference. Even after deliberately making a scratch in the stack of layers, penetrating through the entire stack, the electrowetting effect continues without dielectric breakdown.

Similar devices may also be manufactured from substrates comprising magnesium, aluminum, titanium, vanadium, chromium, zinc, zirconium, niobium, antimony, hafnium, tantalum, tungsten, and bismuth, onto which a corresponding metal oxide layer may be grown by anodization.

The dielectric may be provided by sputtering, evaporating, annealing a paste, atomic layer deposition from a gaseous precursor, chemical vapour deposition, thermal oxidation, eloxation, or anodization.

In an anodization process, the applied voltage difference determines the thickness of the dielectric. For example, for an aluminum oxide layer the attainable thickness is 1.4 nm/V, and for a tantalum oxide layer 2 nm/V.

The inventors have realized that, for a certain thickness of the dielectric, the voltage used to operate the electrowetting device is much lower than the voltage required to grow the dielectric by anodization of the first electrode. This implies that the dielectric does not grow during operation of the electrowetting device. Only in case of a failure in the dielectric the grow process will start, but the dielectric will never become thicker than it was originally designed. For instance, an electrowetting device comprising dielectric in the form of a 100 nm tantalum oxide layer is typically operated at an operating voltage of 10 V, while the tantalum oxide layer has been grown at 50 V. For thicker dielectrics, the difference becomes even larger due to the square-root dependence of electrowetting driving voltage on dielectric thickness, as compared to the linearly dependency of dielectric thickness on anodization voltage.

Particularly when the dielectric comprises a metal oxide layer, the electrowetting device according to the invention is preferably operated with DC voltages with the first electrode having a positive polarity to enable anodization, to prevent dissolution of the metal oxide layer.

However, to prevent charging of the dielectric, it is advantageous to use AC voltages. AC driving is preferably performed such that on average a net positive voltage is applied to the first electrode, to prevent the dielectric should from dissolving. Charge build up may already be prevented by sweeping the voltage between a high positive value (work point) and a low value (decharge point), for example 0 V.

A first way to use AC driving such that on average a net positive voltage is applied to the first electrode, is by adding a positive voltage offset to the AC driving voltage.

By adding a positive offset to the AC voltage, the average voltage can be positive while built-up charge can be removed with a negative voltage. There can be a competition between an anodization process during application of a positive voltage and a dissolution process during application of a negative voltage. These processes are dependent on duration and magnitude of the applied voltages. When the positive offset is too low, the dissolution process might win and the anodized layer could be destroyed. Or, in case there is no anodized layer yet (e.g. in the case of perforated parylene deposited on aluminum), no anodized layer will be formed. When the positive offset is too high, the anodization process might win, but charge removal by applying a negative voltage could be less effective.

Experiments have shown that the offset at which the anodization process just beats the dissolution process is frequency dependent, with a lower frequency requiring a higher DC offset to reach the point where the dissolution and anodization processes are equally strong.

For example, an experiment was performed using an aqueous 8% citric acid solution, surrounded by silicone oil, on a perforated parylene-C coating having a thickness of 300 nm deposited on aluminum. Table 1 gives the DC offset at which the dissolution and anodization processes are equally strong (DC offset threshold), as a function of AC driving frequency. In Table 1, the DC offset is also given as a percentage of the maximum voltage amplitude, which is 7 V in this experiment.

TABLE 1

DC offset threshold as a function of AC driving frequency, for a device using an aqueous 8% citric acid solution, surrounded by silicone oil, on a perforated parylene-C coating having a thickness of 300 nm deposited on aluminum.

| Frequency [Hz] | DC offset threshold [V] | DC offset threshold [%] |
|---|---|---|
| 10 | 1.25 | 18 |
| 25 | 1.00 | 14 |

TABLE 1-continued

DC offset threshold as a function of AC driving frequency,
for a device using an aqueous 8% citric acid solution, surrounded
by silicone oil, on a perforated parylene-C coating having
a thickness of 300 nm deposited on aluminum.

| Frequency [Hz] | DC offset threshold [V] | DC offset threshold [%] |
| --- | --- | --- |
| 50 | 0.50 | 7 |
| 100 | 0.50 | 7 |
| 250 | 0.25 | 4 |
| 500 | −0.50 | −7 |
| 1000 | −1.00 | −14 |
| 2000 | −1.25 | −18 |
| 4000 | −1.50 | −21 |

Higher frequencies may only require a relatively small offset, or even no offset at all. For example, when the aforementioned device is driven with an AC frequency of around 1000 Hz, no offset is required. Theoretically it could be possible that even AC driving with a relatively small negative offset still enables anodization, in case the anodization process is more effective than the dissolution process.

A second way to use AC driving such that on average a net positive voltage is applied to the first electrode, is by performing AC driving using a modified duty cycle. As already mentioned above, the competing anodization and dissolution processes are dependent on duration and magnitude of the applied voltages. When the duration of the period wherein a positive voltage is applied is relatively short compared to the duration of the period wherein a negative voltage is applied, the dissolution process might win and the anodized layer could be destroyed. Or, in case there is no anodized layer yet (e.g. in the case of perforated parylene deposited on aluminium), no anodized layer will be formed. If the duration of the period wherein a positive voltage is applied is relatively long, the anodization process might win, but charge removal during the (relatively short) period wherein a negative voltage is applied could be less effective.

For example, an experiment was performed using an aqueous 8% citric acid solution, surrounded by silicone oil, on a perforated parylene-C coating having a thickness of 300 nm deposited on aluminium. Table 2 gives the duty cycle (fraction of time wherein a positive voltage is applied) at which the dissolution and anodization processes are equally strong (duty cycle threshold), as a function of AC driving frequency.

TABLE 2

Duty cycle threshold as a function of AC driving frequency,
for a device using an aqueous 8% citric acid solution, surrounded
by silicone oil, on a perforated parylene-C coating having
a thickness of 300 nm deposited on aluminum.

| Frequency [Hz] | Duty cycle threshold [%] |
| --- | --- |
| 10 | 95 |
| 25 | 90 |
| 50 | 85 |
| 100 | 60 |
| 250 | 50 |
| 500 | 40 |
| 1000 | 30 |
| 2000 | 15 |
| 4000 | 10 |

Dependent on the choice of materials and conditions, AC driving can effectively be used to prevent charging. For the aforementioned device, the fraction of time wherein a positive voltage is applied is preferably 50% or more when AC driving frequencies of about 250 Hz or less are used. For higher AC driving frequencies, the fraction of time wherein a positive voltage is applied may be lower than 50%.

Theoretically, a duty cycle wherein the duration of the period wherein a positive voltage is applied is shorter than the duration of the period wherein a negative voltage is applied can still enable anodization when the anodization process is more effective than the dissolution process.

The terms "first", "second", and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim, nor does it exclude embodiments wherein the verb means "to consists of". The article "a" or "an" preceding an element does not exclude the presence of a plurality of such elements. The mere fact that certain measures are recited in mutually different dependent claims does not indicate that a combination of these measures cannot be used to advantage.

The invention claimed is:

1. An electrowetting device comprising one or more cells, each cell comprising:
    an electrowetting composition comprising first and second immiscible fluids, the first fluid comprising an electrolytic solution;
    a first electrode comprising a valve metal separated from the electrowetting composition by a dielectric; and
    a voltage source for applying an operating voltage difference between the first electrode and the electrolytic solution to operate the electrowetting device and to cause the electrolytic solution
    to form a metal oxide layer on the valve metal under anodic conditions and to locally repair the dielectric.

2. The electrowetting device of claim 1, wherein the dielectric is a stack, the stack comprising a hydrophobic layer that is in contact with the electrowetting composition.

3. The electrowetting device of claim 2, wherein the hydrophobic layer comprises an amorphous fluoropolymer.

4. The electrowetting device of claim 1, wherein the dielectric comprises a metal oxide layer formed by anodizing the valve metal of the first electrode.

5. The electrowetting device of claim 1, wherein the dielectric comprises parylene.

6. The electrowetting device of claim 1, wherein the electrolytic solution comprises an acid.

7. The electrowetting device of claim 6, wherein the acid is an organic acid.

8. The electrowetting device of claim 6, wherein the acid is chosen from the group consisting of citric acid, tartaric acid and boric acid.

9. The electrowetting device of claim 1, wherein the electrolytic solution comprises a salt.

10. The electrowetting device of claim 9, wherein the salt is chosen from the group consisting of borates, tartrates, citrates and phosphates.

11. The electrowetting device of claim 1, wherein the valve metal is chosen from the group consisting of magnesium, aluminum, titanium, vanadium, chromium, zinc, zirconium, niobium, antimony, hafnium, tantalum, tungsten, and bismuth.

12. The electrowetting device of claim 1, wherein the electrolytic solution comprises a hydrogen getter.

13. A method of manufacturing an electrowetting device, comprising:
   providing one or more cells, each cell comprising:
      an electrowetting composition, having first and second immiscible fluids, the first fluid being an electrolytic solution,
      separating a first electrode from the electrowetting composition by a dielectric, the first electrode comprising a valve metal,
      forming the dielectric by anodizing the valve metal of the first electrode, and
      applying an operating voltage difference between the first electrode and the electrolytic solution to operate the electrowetting device, the operating voltage difference causing electrolytic solution to anodize the valve metal to form a metal oxide and to locally repair the dielectric.

14. The electrowetting device of claim 1, wherein a time-averaged net positive voltage is applied to the first electrode creating a voltage difference between the first electrode and the electrolytic solution.

15. The electrowetting device of claim 1, wherein
   the operating voltage being an AC voltage having a selected frequency and having a selected net average positive value,
   the dielectric is an oxide of the valve metal, and
   said frequency and said average net positive value are selected in combination in such a way that said net average positive value is the minimum required to prevent net dissolution of the metal oxide due to failure in the dielectric.

16. A method of operating an electrowetting device comprising:
   providing one or more cells, each cell comprising:
      an electrowetting composition having first and second immiscible fluids, the first fluid comprising an electrolytic solution;
      separating a first electrode comprising a valve metal from the electrowetting composition by a dielectric; and
      applying an operating voltage difference between the first electrode and the electrolytic solution to cause the electrolytic solution to locally repair the dielectric, the operating voltage difference configured to cause the electrolytic solution to form a metal oxide on the dielectric under anodic conditions and to locally repair the dielectric.

17. The method of claim 16, wherein the electrolytic solution further comprises a hydrogen getter.

* * * * *